United States Patent
Zhou

(10) Patent No.: US 10,225,151 B2
(45) Date of Patent: Mar. 5, 2019

(54) SESSION MANAGEMENT METHOD, APPLICATION FUNCTION ENTITY, POLICY SERVER AND PROTOCOL CONVERTER

(71) Applicant: ZTE CORPORATION, Shenzhen, Guangdong Province (CN)

(72) Inventor: Xiaoyun Zhou, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 297 days.

(21) Appl. No.: 15/506,945

(22) PCT Filed: Jul. 18, 2014

(86) PCT No.: PCT/CN2014/082548
§ 371 (c)(1),
(2) Date: Feb. 27, 2017

(87) PCT Pub. No.: WO2015/010576
PCT Pub. Date: Jan. 29, 2015

(65) Prior Publication Data
US 2017/0331691 A1  Nov. 16, 2017

(30) Foreign Application Priority Data

Jul. 26, 2013 (CN) .......................... 2013 1 0319571
Apr. 18, 2014 (WO) ................ PCT/CN2014/075677
Jun. 27, 2014 (CN) .......................... 2014 1 0301186

(51) Int. Cl.
*G06F 15/16* (2006.01)
*H04L 12/24* (2006.01)
(Continued)

(52) U.S. Cl.
CPC .......... *H04L 41/0893* (2013.01); *H04L 12/14* (2013.01); *H04L 12/1407* (2013.01);
(Continued)

(58) Field of Classification Search
CPC . H04L 29/08072; H04L 29/06; H04L 63/327; H04L 63/10
(Continued)

(56) References Cited

U.S. PATENT DOCUMENTS 8,811,393 B2 * 8/2014 Reddy ................ H04W 80/045
370/389
9,009,293 B2 * 4/2015 Batz ...................... H04L 43/026
709/224
(Continued)

FOREIGN PATENT DOCUMENTS

CN 101217789 A 7/2008
CN 101583112 A 11/2009
(Continued)

OTHER PUBLICATIONS

"Technical Specification Group Core Network and Terminals; Study on XML Based Access of AF to the PCRF" for 3rd Generation Partnership Project; Release 12; 3GPP TR 29.817 V0.1.0 (Jun. 2013).
(Continued)

*Primary Examiner* — Khanh Q Dinh
(74) *Attorney, Agent, or Firm* — Plumsea Law Group, LLC

(57) ABSTRACT

The embodiments of the present disclosure disclose a session management method, an Application Function (AF) entity, a policy server, and a Protocol Converter. The method includes: When an AF entity establishes an AF session with a policy server, the AF entity sends a first HTTP request message to the policy server, herein the AF entity sends AF session identifier information to the policy server via the first HTTP request message, or AF session identifier information is allocated by the policy server and is sent to the AF entity via an answer for the first HTTP request message. When the policy server notifies the AF entity of a traffic plane event of (Continued)

the above-mentioned AF session, the policy server sends a second HTTP request message carrying the AF session identifier information to the AF entity. The AF entity returns an answer for the second HTTP request message to the policy server.

14 Claims, 6 Drawing Sheets

(51) Int. Cl.
| | |
|---|---|
| H04W 76/12 | (2018.01) |
| H04L 29/06 | (2006.01) |
| H04L 29/08 | (2006.01) |
| H04L 12/14 | (2006.01) |
| H04M 15/00 | (2006.01) |
| H04W 4/24 | (2018.01) |

(52) U.S. Cl.
CPC ........ *H04L 29/06* (2013.01); *H04L 29/08072* (2013.01); *H04L 41/0273* (2013.01); *H04L 67/02* (2013.01); *H04L 67/14* (2013.01); *H04L 69/08* (2013.01); *H04L 69/16* (2013.01); *H04M 15/66* (2013.01); *H04M 15/8228* (2013.01); *H04W 4/24* (2013.01); *H04W 76/12* (2018.02)

(58) Field of Classification Search
USPC ................ 709/224, 220, 203, 226, 228, 232
See application file for complete search history.

(56) References Cited

U.S. PATENT DOCUMENTS

| | | | | |
|---|---|---|---|---|
| 9,015,318 | B1* | 4/2015 | Batz | H04L 61/1511 |
| | | | | 709/217 |
| 9,118,730 | B2* | 8/2015 | Fernandez Alonso | |
| | | | | H04L 67/2842 |
| 9,369,291 | B2* | 6/2016 | Holm | H04L 41/0893 |
| 9,491,045 | B2* | 11/2016 | Kvernvik | H04L 41/0681 |
| 9,503,483 | B2* | 11/2016 | Martinez De La Cruz | |
| | | | | H04L 65/1046 |
| 9,762,580 | B2* | 9/2017 | Belling | H04L 63/20 |
| 2011/0202635 | A1 | 8/2011 | Yeung et al. | |

FOREIGN PATENT DOCUMENTS

| | | |
|---|---|---|
| WO | 2011/101021 A1 | 8/2011 |
| WO | 2012058643 A2 | 5/2012 |
| WO | 2013/048187 A2 | 4/2013 |

OTHER PUBLICATIONS

"Technical Specification Group Core Network and Terminals; Study on eXtensible Markup Language (XML) based access of the Application Function to the Policy and Charge Rules Function" for 3rd Generation Partnership Project; Release 12; 3GPP TR 29.817 V12.0.0 (Mar. 2014).

International Search Report and Written Opinion dated Oct. 24, 2014 for PCT Application No. PCT/CNj2014/082548.

Extended European Search Report dated Jul. 18, 2017 for European Patent Application No. 14828651.1.

"3rd Generation Partnership Project; Technical Specification Group Core Network and Terminals; Study on XML based access of AF to the PCRF (Release 12)", 3GPP Draft; 29817-010, 3rd Generation Partnership Project, Mobile Competence Centre; 650, Route Des Lucioles; F-06932 Sophia-Antipolis Cedex; France, Jun. 8, 2013, XP050695196, Retrieved from the internet: URL: http://www.3gpp.org/ftp/tsg_ct/WG3_interworking_ex-CN3/TSGC3_73_Chengdu/Docs/.

* cited by examiner

SESSION MANAGEMENT METHOD, APPLICATION FUNCTION ENTITY, POLICY SERVER AND PROTOCOL CONVERTER

CROSS-REFERENCE TO RELATED APPLICATION(S)

This application is the US National Phase application of PCT application number PCT/CN2014/082548 having a PCT filing date of Jul. 18, 2014, which claims priority of Chinese patent application number 201410301186.4 filed on Jun. 27, 2014, which was also filed with the International Bureau on Apr. 18, 2014 under PCT Application Number PCT/CN2014/075677, which claims priority to Chinese patent application number 201310319571.7 filed on Jul. 26, 2013, the disclosures of which are hereby incorporated by reference.

TECHNICAL FIELD

The present disclosure relates to the field of communications, and more particularly to a session management method, an Application Function (AF) entity, a policy server, and a Protocol Converter (PC).

BACKGROUND OF THE RELATED ART

FIG. 1 is a Policy and Charging Control (PCC) defined by a 3rd Generation Partnership Project (3GPP).

A Policy and Charging Rules Function (PCRF) is to make the Quality of Service (QoS) and a charging policy for a service by using network resources. The PCRF needs to make the control policy in combination with service information received from an AF, subscription information received from a Subscription Profile Repository (SPR), a policy configured by an operator, etc. The PCRF issues a control policy made for the service to a Policy and Charging Enforcement Function (PCEF) or a Bearer Binding and Event Report Function (BBERF) to be executed. Meanwhile, the PCRF may subscribe the PCEF and/or the BBERF for a traffic plane related event, such that when the event occurs in a traffic plane, the event is perceived in time, and the control policy is changed. Besides, the PCEF and a Traffic Detection Function (TDF) can execute an application detection and control function according to a PCC rule (PCEF) or ADC rule (TDF) issued by the PCRF.

With the development of mobile internet, an operator needs to intercommunicate with a third-party data application provider, and performs QoS guarantee on a service provided by the third-party data application provider. Since an Rx interface supported by the PCC currently adopts a Diameter protocol, most of third-party data application providers are more skilled in development based on SOAP and REST protocols. At present, the industry researches a PCC architecture to support an Rx interface based on the SOAP/REST protocol. Two solutions are proposed, one solution is that the PCRF supports the SOAP or REST protocol, and another solution is that the PCRF and the AF directly provide a network element called as a Protocol Converter (PC) for converting the SOAP or REST protocol into Diameter. At present, the SOAP protocol supports an Extensible Markup Language (XML), and the REST protocol supports the XML and a JavaScript Object Notation (JSON) language.

The Rx interface needs to support two-way communication. That is, the AF provides service information for the PCRF, and the PCRF needs to provide a traffic plane event for the AF in real time. However, the SOAP or REST protocol is based on a Hypertext Transfer Protocol (HTTP). The HTTP is a stateless protocol, a client requests for a Uniform Resource Locator (URL), a server gives a response and sends response content, and a port is connected, but two-way communication cannot be implemented. In order to make the server actively push information to the client, the industry proposes the following three solutions at present.

1. Polling: a browser continuously sends a request to obtain latest data to simulate into push. The solution is disadvantageous in large delay and high signaling overhead.

2. Streaming: after the server receives an HTTP request of the client and returns an acknowledgement message, the connection between the server and the client is not disconnected, and the server may continuously send data to the client via the connection. The solution is disadvantageous in occupation of resources of the server and the client due to maintenance of the connection. Its Proxy support is not good, because a proxy may cache data.

3. Long-Polling: the browser sends a request, after receiving the request, the server hangs the connection until there is data needing to be sent to the client, and after the data is completely sent, the connection is disconnected; and the client receives the data, and requests the server again to take data. The solution is disadvantageous in occupation of the resources of the server and the client due to maintenance of the connection.

In view of a special application of the PCC, a third-party data application needs to provide service for a great number of users. Therefore, if the Streaming or Long-Polling solution is used, a great number of Transmission Control Protocol (TCP) connections need to be kept between a third-party data application server and the PCRF or PC.

Besides, in a related protocol, it is also provided that at most two HTTP TCP connections can be kept between an identical client and server. If more than two HTTP TCP connections are kept, it is inconsistent with the related protocol, thereby causing the problem of conductivity.

The related technology also proposes that a plurality of HTTP requests may be packaged into a TPC connection (becoming HTTP Pipelining), and the server can actively provide data to the client in a Long-Polling mode. However, the solution requires that the client may send a new request only after Long-Polling is completed, which may cause a delay.

SUMMARY OF THE INVENTION

The embodiments of the present disclosure provide a session management method, an application function (AF) entity, a policy server, and a protocol converter (PC), capable of implementing two-way communication, reducing usage of network resources, and ensuring the real-time performance.

A session management method includes the following steps.

When an application function (AF) entity establishes an AF session with a policy server, the AF entity sends a first HTTP request message to the policy server.

Herein, the AF entity sends AF session identifier information to the policy server via the first HTTP request message; or, the AF entity acquires AF session identifier information allocated for the AF session by the policy server from an answer for the first HTTP request message returned by the policy server.

When the policy server notifies the AF entity of a traffic plane event of the AF session, the AF entity receives a second HTTP request message sent to the AF entity, the second HTTP request message carries the AF session identifier information.

The AF entity returns an answer for the second HTTP request message to the policy server.

In an exemplary embodiment, the policy server is a Policy and Charging Rules Function (PCRF) entity or a Protocol Converter (PC).

In an exemplary embodiment, when the AF entity modifies or terminates the AF session, the AF entity sends a third HTTP request message to the policy server, the third HTTP request message carries the AF session identifier information.

The AF entity receives an answer for the third HTTP request message returned by the policy server.

In an exemplary embodiment, the AF session identifier information is a global unique identifier.

In an exemplary embodiment, the AF session identifier information is expressed by using any one of the following combinations:

a service session identifier and an Internet Protocol (IP) address of a User Equipment (UE);

a service session identifier, an IP address of a UE, and an IP domain identifier;

a service session identifier, an IP address of a UE, and a Packet Data Network (PDN) identifier; and a service session identifier and a user identifier.

In an exemplary embodiment, the AF entity supports an HTTP client and an HTTP server simultaneously, and the policy server supports the HTTP client and the HTTP server simultaneously.

In an exemplary embodiment, that the AF entity sends the first HTTP request message or the third HTTP request message to the policy server includes the following steps.

When a first TCP connection has existed between the AF entity and the policy server, the AF entity sends the first HTTP request message or the third HTTP request message to the policy server by using the first TCP connection.

When the first TCP connection is not established between the AF entity and the policy server, the AF establishes the first TCP connection with the policy server first, and then sends the first HTTP request message or the third HTTP request message.

In an exemplary embodiment, after receiving the answer for the first HTTP request message or the third HTTP request message sent by the policy server, the AF entity retains the first TCP connection between the AF entity and the policy server; or, after receiving the answer for the first HTTP request message or the third HTTP request message sent by the policy server, the AF entity disconnects the first TCP connection between the AF entity and the policy server.

A session management method includes the following steps.

A policy server receives a first HTTP request message sent by an Application Function (AF) entity and carrying AF session identifier information, and returns an answer for the first HTTP request message to the AF entity; or, a policy server receives a first HTTP request message sent by an AF entity, allocates AF session identifier information for an AF session, and returns an answer for the first HTTP request message carrying the AF session identifier information to the AF entity.

When notifying the AF entity of a traffic plane event of the AF session, the policy server sends a second HTTP request message carrying the AF session identifier information to the AF entity, and receives an answer for the second HTTP request message returned by the AF entity.

In an exemplary embodiment, the policy server is a Policy and Charging Rules Function (PCRF) entity or a Protocol Converter (PC).

In an exemplary embodiment, that the policy server sends the second HTTP request message to the AF entity includes the following steps.

When a second TCP connection has existed between the policy server and the AF entity, the policy server sends the second HTTP request message to the AF entity by using the second TCP connection.

When the second TCP connection is not established between the policy server and the AF entity, the policy server establishes the second TCP connection with the AF entity first, and then sends the second HTTP request message.

In an exemplary embodiment, the method further includes the following steps.

After receiving the answer for the second HTTP request message sent by the AF entity, the policy server retains the second TCP connection between the policy server and the AF entity; or, After receiving the answer for the second HTTP request message sent by the AF entity, the policy server disconnects the second TCP connection between the policy server and the AF entity.

In an exemplary embodiment, the policy server is a PC, and after the policy server receives the first HTTP request message, the method further includes that: the PC sends a diameter Authentication and Authorization Request (AAR) message to a PCRF entity, and requests to establish a diameter session, herein the AAR message carries a diameter session identifier; and the PC keeps a corresponding relation between the AF session identifier information and the diameter session identifier.

In an exemplary embodiment, the above-mentioned method further includes that: the policy server receives a third HTTP request message sent to the PC by the AF entity and carrying the AF session identifier information, and the PC sends a diameter AAR message or a diameter Session Termination Request (STR) message to the PCRF entity, herein the AAR or STR message carries the diameter session identifier.

In an exemplary embodiment, when the policy server is a PC, that the policy server sends the second HTTP request message to the AF entity includes the following steps.

When the PCRF entity sends a diameter Re-Authentication Request (RAR) carrying the diameter session identifier, and an Abort Session Request (ASR) or Session Termination Answer (STA) message to the PC, the PC sends the second HTTP request message carrying the AF session identifier information to the AF entity.

An AF entity includes:

a first unit, arranged to: send a first HTTP request message to the policy server and receive an answer for the first HTTP request message returned by the policy server when the AF entity establishes an AF session with a policy server, herein, the first unit is arranged to: carry AF session identifier information in the first HTTP request message, or acquire the AF session identifier information from the answer for the first HTTP request message returned by the policy server; and a second unit, arranged to: receive a second HTTP request message sent by the policy server and carrying the AF session identifier information when the policy server notifies the AF entity of a traffic plane event of the AF session, and return an answer for the second HTTP request message to the policy server.

In an exemplary embodiment, the AF entity further includes:

a third unit, arranged to: send, when the AF entity modifies or terminates the AF session, a third HTTP request message carrying the AF session identifier information to the policy server, and receive an answer for the third HTTP request message returned by the policy server.

In an exemplary embodiment, the first unit is arranged to: send, when a first TCP connection has existed between the AF entity and the policy server, the first HTTP request message to the policy server by using the first TCP connection; establish, when the first TCP connection is not established between the present AF and the policy server, the first TCP connection with the policy server first, and then send the first HTTP request message.

The third unit is arranged to: send, when the first TCP connection has existed between the AF entity and the policy server, the third HTTP request message to the policy server by using the first TCP connection; establish, when the first TCP connection is not established between the present AF and the policy server, the first TCP connection with the policy server first, and then send the third HTTP request message.

In an exemplary embodiment, the first unit is further arranged to: retain, after receiving the answer for the first HTTP request message sent by the policy server, the first TCP connection between the AF entity and the policy server; or, disconnect the first TCP connection between the AF entity and the policy server.

The third unit is further arranged to: retain, after receiving the answer for the third HTTP request message sent by the policy server, the first TCP connection between the AF entity and the policy server; or, disconnect the first TCP connection between the AF entity and the policy server.

In an exemplary embodiment, the second unit is arranged to: receive the second HTTP request message by using a second TCP connection between the policy server and the AF entity, and return the answer for the second HTTP request message to the policy server by using the second TCP connection.

A policy server includes:

a first unit, arranged to: receive a first HTTP request message sent by an AF entity and carrying AF session identifier information, and return an answer for the first HTTP request message to the AF entity; or, receive a first HTTP request message sent by an AF entity, allocate AF session identifier information for an AF session, and return an answer for the first HTTP request message carrying the AF session identifier information to the AF entity; and a second unit, arranged to: send, when notifying the AF entity of a traffic plane event of the AF session, a second HTTP request message carrying the AF session identifier information to the AF entity, and receive an answer for the second HTTP request message returned by the AF entity.

In an exemplary embodiment, the first unit is arranged to: receive the first HTTP request message by using a first TCP connection between the AF entity and the present policy server, and return the answer for the first HTTP request message to the AF entity by using the first TCP connection.

In an exemplary embodiment, the second unit is arranged to: send, when a second TCP connection has existed between the present policy server and the AF, the second HTTP request message to the AF by using the second TCP connection; and establish, when the second TCP connection is not established between the policy server and the AF, the second TCP connection with the AF, and then send the second HTTP request message.

In an exemplary embodiment, the second unit is arranged to: retain, after receiving the answer for the second HTTP request message sent by the AF entity, the second TCP connection between the present policy server and the AF entity; or, disconnect the second TCP connection between the present policy server and the AF entity.

In an exemplary embodiment, the policy server is a Policy and Charging Rules Function (PCRF) entity or a Protocol Converter (PC).

A Protocol Converter (PC) includes:

a first unit, arranged to: receive a first HTTP request message sent by an Application Function (AF) entity and carrying AF session identifier information in an AF session establishment process, send a diameter AAR message to a PCRF entity, request to establish a diameter session, herein the AAR message carries a diameter session identifier, and keep a corresponding relation between the AF session identifier information and the diameter session identifier; or, receive a first HTTP request message sent by an AF entity, allocate AF session identifier information for the AF session, send a diameter AAR message to a PCRF entity, request to establish a diameter session, herein the AAR message carries a diameter session identifier, and keep a corresponding relation between the AF session identifier information and the diameter session identifier;

a second unit, arranged to: receive a third HTTP request message sent by the AF entity and carrying the AF session identifier information in an AF session modification or termination process, and send a diameter AAR message or a diameter STR message to the PCRF entity; and a third unit, arranged to: receive a diameter RAR sent by the PCRF entity and carrying the diameter session identifier, and an ASR or STA message in a traffic plane event reporting process, and send the second HTTP request message carrying the AF session identifier information to the AF.

The embodiments of the present disclosure also provide a computer program, including program instructions. When the program instructions are executed by an AF entity, the AF entity is enabled to execute the above-mentioned method.

An embodiment of the present disclosure also provides a computer program, including program instructions. When the program instructions are executed by a policy server, the policy server is enabled to execute the above-mentioned method.

An embodiment of the present disclosure also provides a carrier carrying any one of the above-mentioned computer programs.

The technical solution of the embodiments of the present application solves the problem that an AF and a PCRF or PC can perform two-way information transmission in real time based on an HTTP.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
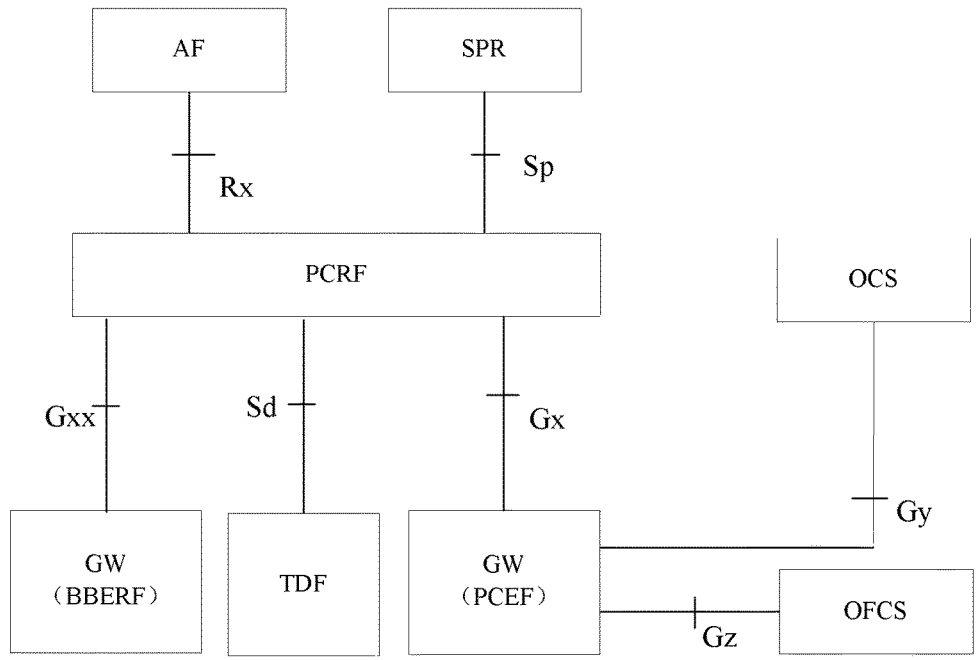
FIG. 1 is a PCC architecture diagram in the existing technology.

The embodiments of the present disclosure will be elaborated herein below in combination with the accompanying drawings. It should be noted that the embodiments in the present application and the features in the embodiments may be randomly combined without conflicts.

Embodiment 1

The present embodiment provides a session management method, including the following steps.

When an AF entity establishes an AF session with a policy server, the AF entity sends a first HTTP request message to the policy server.

Herein, the AF entity carries AF session identifier information in the first HTTP request message to notify the policy server, and the policy server returns an answer for the first HTTP request message to the AF entity; or, after receiving the first HTTP request message, the policy server allocates AF session identifier information for the AF session, and sends the AF session identifier information in an answer for the first HTTP request message to the AF entity.

When the policy server notifies the AF entity of a traffic plane event of the above-mentioned AF session, the policy server sends a second HTTP request message to the AF entity, the second HTTP request message carries the above-mentioned AF session identifier information, and the AF entity returns an answer for the second HTTP request message to the policy server.

Herein, the policy server may be a PCRF entity or a PC.

The AF session identifier information involved in the above-mentioned method is a global unique identifier or a combination of a service session identifier and other information. The combination of the service session identifier and other information may be expressed by using any one of the following combinations:

a service session identifier and an IP address of a UE; herein, the service session identifier is an identifier capable of uniquely identifying the AF session under the condition of an IP address of the same UE;

a service session identifier, an IP address of a UE, and an IP domain identifier; herein, the service session identifier is an identifier capable of uniquely identifying the AF session under the condition of an IP address and IP domain identifier of the same UE;

a service session identifier, an IP address of a UE, and a PDN identifier; herein, the service session identifier is an identifier capable of uniquely identifying the AF session under the condition of an IP address and PDN identifier of the same UE; and a service session identifier and a user identifier; herein, the service session identifier is an identifier capable of uniquely identifying the AF session under the condition of an IP address and user identifier of the same UE.

Besides, on the basis of the above-mentioned method, when the AF entity and the policy server modify or terminate the above-mentioned AF session, the AF entity will send a third HTTP request message to the policy server, the third HTTP request message carries the AF session identifier information. The policy server returns an answer for the third HTTP request message.

An implementation process of the above-mentioned method will be elaborated herein below in combination with an application scenario.

Firstly, a session flow in which an Rx interface between an AF entity and a PCRF entity (i.e., policy server) supports a SOAP or REST protocol is illustrated by taking a PCC architecture shown in FIG. 1 as an example.

Figure 3:
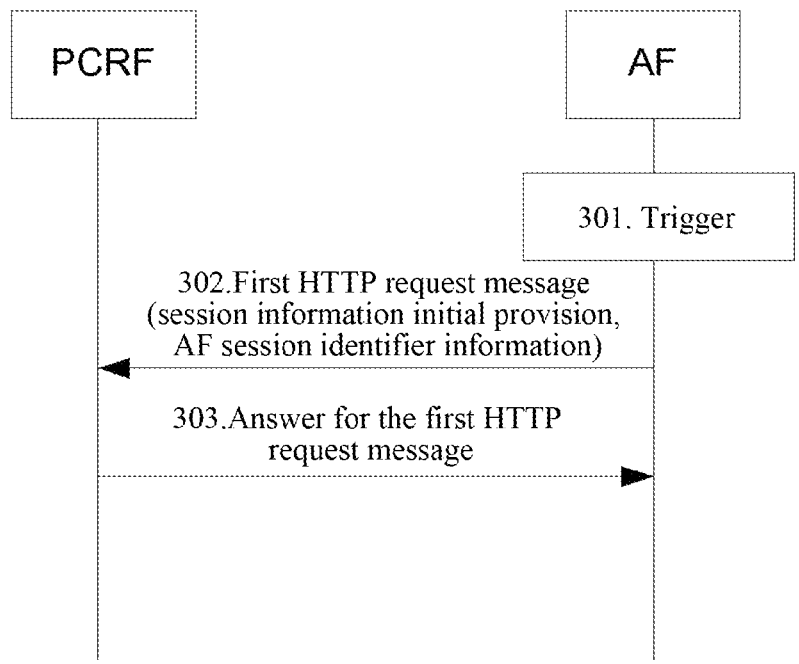
FIG. 3 is a flowchart of AF session establishment according to an embodiment 1 of the present disclosure.

FIG. 3 is a session management flowchart in a session information initial providing process (i.e., AF session establishment process), including the following Steps 301 to 303.

In Step 301, A UE is attached to a network, and initiates an attachment flow, or after the UE initiates an additional PDN connection establishment flow, the UE interacts with an AF entity to make a media negotiation. The AF entity determines service related information.

In Step 302, The AF entity initiates an AF session establishment flow to a PCRF entity to establish an AF session, and provides AF session identifier information and service information. The AF session identifier information may be allocated by the AF entity at this time or allocated for the AF entity by the PCRF entity in a previous interaction.

In the step, the AF entity sends a first HTTP request message to the PCRF, the first HTTP request message carries the AF session identifier information and the service information. Besides, the first HTTP request message may also carry an explicit AF session establishment indicator. An own URL (expressed as URL1) of the AF entity may also be carried in the message. The AF entity may construct a URL of the PCRF according to an IP address of a UE, a user identifier (if existing), PDN information and domain identifier information for addressing the PCRF.

Herein, the AF session identifier information may be information about a global unique identifier for the AF session; or may be an information combination, formed by a service session identifier in combination with other information, for uniquely identifying the AF session. In the present embodiment, when the AF session identifier information is a combination of the service session identifier and other information, the AF session identifier information may adopt any of the following combinations:

(1) a service session identifier and an IP address of a UE; herein, the service session identifier is an identifier capable of uniquely identifying the AF session under the condition of an IP address of the same UE;

(2) a service session identifier, an IP address of a UE, and an IP domain identifier; herein, the service session identifier is an identifier capable of uniquely identifying the AF session under the condition of an IP address and IP domain identifier of the same UE;

(3) a service session identifier, an IP address of a UE, and a PDN identifier; herein, the service session identifier is an identifier capable of uniquely identifying the AF session under the condition of an IP address and PDN identifier of the same UE; and (4) a service session identifier and a user identifier; herein, the service session identifier is an identifier capable of uniquely identifying the AF session under the condition of an IP address and user identifier of the same UE.

In Step 303, The PCRF entity saves the service information provided by the AF entity, and the PCRF entity returns an answer for the first HTTP request message to the AF entity.

In the above-mentioned flow, a TCP connection between the AF entity and the PCRF entity may be processed by using the following two solutions.

1) An HTTP persistent connection mechanism is used. When Step 302 is executed, if a TCP connection (called as a first TCP connection in the present embodiment) has existed between the AF entity and the PCRF, the AF entity sends the first HTTP request message to the PCRF by using the existing first TCP connection. If the first TCP connection does not exist, the AF establishes the first TCP connection with the PCRF, and then sends the first HTTP request message. After Step 303 is executed, the first TCP connection is not disconnected.

2) The HTTP persistent connection mechanism is not used. When Step 302 is executed, the AF entity establishes the first TCP connection with the PCRF entity, and then sends the first HTTP request message. After Step 303 is executed, the first TCP connection is disconnected.

In the above-mentioned flow, the AF session identifier information for identifying the AF session is allocated by the AF entity (if AF session identifier information is an independent global unique identifier, the AF session identifier information is allocated by the AF, and if AF session identifier information is a combination of a service session identifier and other information, the service session identifier is allocated by the AF). Certainly, related information may also be allocated by the PCRF entity. If the AF session identifier information is an independent global unique identifier, the AF session identifier information may be allocated by the PCRF entity. That is, in Step 302, the first HTTP request message sent to the PCRF entity by the AF only carries service information (the service information including a UE IP address, an IP domain identifier (optional), a user identifier (optional), and a PDN identifier (optional)). In Step 303, the PCRF entity allocates a global AF session identifier for the AF session according to the service information, and sends the global AF session identifier in the answer for the first HTTP request message to the AF entity. If the AF session identifier information is a combination of a service session identifier and other information, the service session identifier may also be allocated by the PCRF entity. That is, in Step 302, the first HTTP request message sent to the PCRF entity by the AF entity only carries service information (the service information including a UE IP address, an IP domain identifier (optional), a user identifier (optional), and a PDN identifier (optional)). In Step 303, the PCRF entity allocates a service session identifier for the AF session according to the service information, and sends other information in an information combination of the service session identifier and the AF session identifier (i.e., AF session identifier information) in the answer for the first HTTP request message to the AF entity.

The AF may aggregate a plurality of pieces of information for requesting to establish an AF session in an HTTP request message (e.g., carrying service information and AF session identifier information corresponding to a plurality of AF sessions (if the AF session identifier information is allocated by the AF)), and the PCRF entity may also aggregate answer information about a plurality of AF sessions requested to be established in an HTTP answer message (e.g., AF session identifier information allocated for each AF session by the PCRF entity (if the AF session identifier information is allocated by the PCRF entity)).

Figure 4:
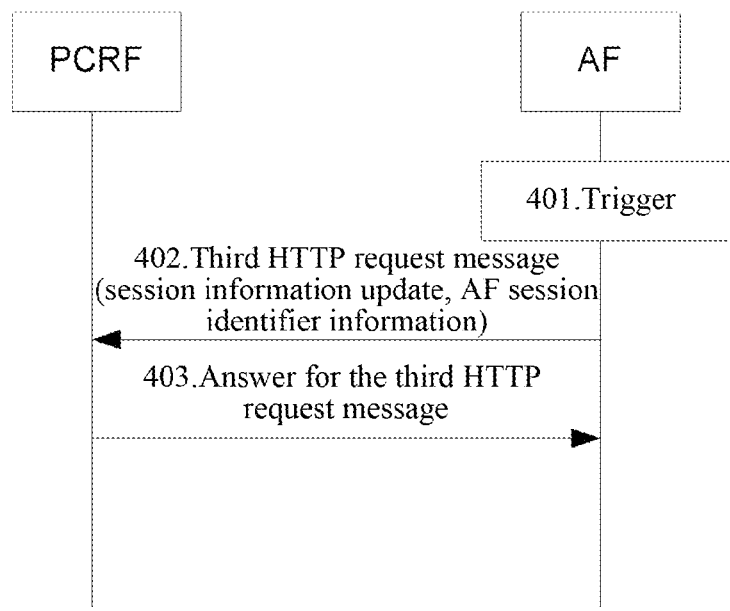
FIG. 4 is a flowchart of AF session modification according to an embodiment 1 of the present disclosure.

FIG. 4 is a session management flowchart in a session information updating process (i.e., AF session modification process), including the following Steps 401 to 403.

In Step 401, A UE interacts with an AF entity to make a media re-negotiation. The AF determines service related information.

In Step 402, The AF entity initiates an AF session modification flow (i.e., modification of an AF session established in FIG. 3) to a PCRF entity, and provides updated service information.

In the step, the AF entity sends to the PCRF entity a third HTTP request message carrying updated media description information and AF session identifier information defined in FIG. 3. Besides, the third HTTP request message may also carry an explicit AF session modification indicator.

In Step 403, The PCRF entity determines previously-saved service information according to the AF session identifier information, and performs corresponding update. The PCRF entity returns an answer for the third HTTP request message to the AF entity.

In the above-mentioned flow, a TCP connection between the AF entity and the PCRF entity may be processed by using the following two solutions.

(1) An HTTP persistent connection mechanism is used. When Step 402 is executed, the AF sends the third HTTP request message to the PCRF entity by using an existing TCP connection (i.e., first TCP connection). After Step 403 is executed, the first TCP connection is not disconnected.

(2) The HTTP persistent connection mechanism is not used. When Step 402 is executed, the AF entity establishes the first TCP connection with the PCRF entity, and then sends the third HTTP request message. After Step 403 is executed, the first TCP connection is disconnected.

The AF may aggregate a plurality of pieces of information for requesting to modify an AF session in an HTTP request message (e.g., carrying service information and AF session identifier information corresponding to a plurality of AF sessions), and the PCRF entity may also aggregate answer information about a plurality of AF sessions requested to be modified in an HTTP answer message.

Figure 5:
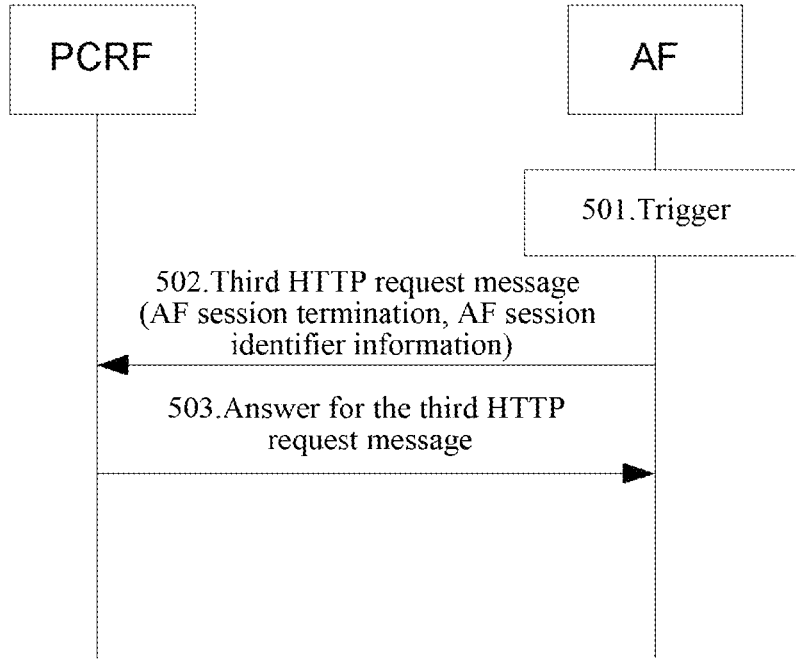
FIG. 5 is a flowchart of AF session termination according to an embodiment 1 of the present disclosure.

FIG. 5 is a session management flowchart in an AF session termination process, including the following Steps 501 to 503.

In Step 501, A UE interacts with an AF entity to terminate a session.

In Step 502, The AF entity initiates an AF session termination flow to a PCRF entity, and terminates an AF session established in FIG. 3.

The step is specifically implemented as follows. The AF entity sends to the PCRF entity a third HTTP request message carrying a session termination indicator and AF session identifier information defined in FIG. 3. The third HTTP request message may also carry an explicit AF session termination indicator.

In Step 503, The PCRF entity determines previously-saved service information according to the AF session identifier information, and performs deletion. The PCRF entity returns an answer for the third HTTP request message to the AF entity.

In the above-mentioned flow, a TCP connection between the AF entity and the PCRF entity may be processed by using the following two solutions.

(1) An HTTP persistent connection mechanism is used. When Step 502 is executed, the AF entity sends the third HTTP request message to the PCRF entity by using an existing TCP connection (i.e., first TCP connection). After Step 503 is executed, the first TCP connection is not disconnected.

(2) The HTTP persistent connection mechanism is not used. When Step 502 is executed, the AF entity establishes the first TCP connection with the PCRF entity, and then sends the third HTTP request message. After Step 503 is executed, the first TCP connection is disconnected.

The AF entity may aggregate a plurality of pieces of information for requesting to terminate an AF session in an HTTP request message (e.g., carrying service information and AF session identifier information corresponding to a plurality of AF sessions), and the PCRF entity may also aggregate answer information about a plurality of AF sessions requested to be terminated in an HTTP answer message.

Figure 6:
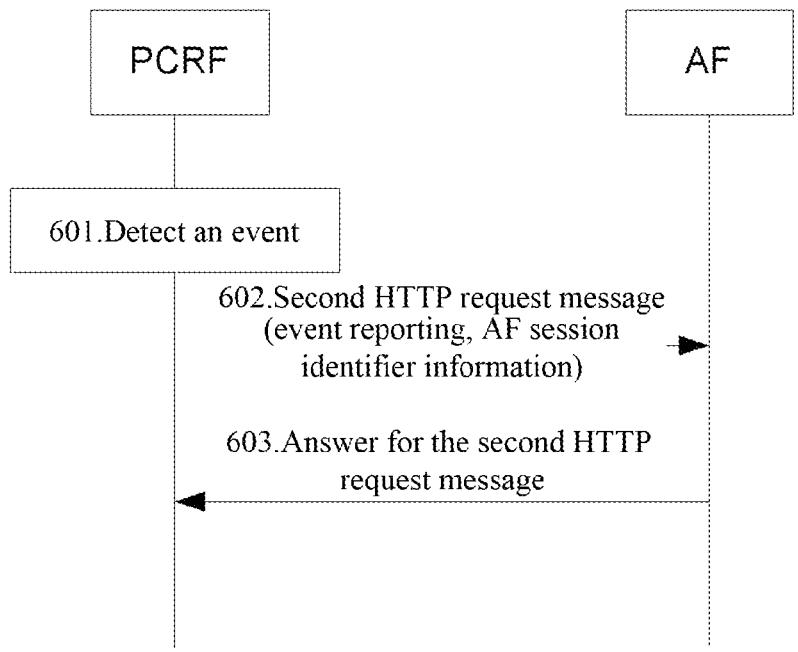
FIG. 6 is a flowchart of event reporting according to an embodiment 1 of the present disclosure.

FIG. 6 is a session management flowchart in a traffic plane event reporting process, including the following Steps 601 to 603.

In Step 601, A PCRF entity perceives a traffic plane event such as change of an IP-CAN type.

In Step 602, The PCRF entity reports a traffic plane event related to an AF session established in FIG. 3 to an AF entity.

In the step, the PCRF entity sends a second HTTP request message to the AF entity; herein, the second HTTP request message carries the traffic plane event and AF session identifier information defined in the embodiment 1. A URL for addressing the AF entity in the second HTTP request message is URL1 provided by the AF entity in FIG. 3.

In Step 603, The AF entity determines an application layer session corresponding to the UE according to the AF session identifier information, and learns of a traffic plane event corresponding to the application layer session, thereby performing related processing. The AF entity returns an answer for the second HTTP request message to the PCRF entity.

In the above-mentioned flow, a TCP connection between the PCRF entity and the AF entity may be processed by using the following two solutions.

(1) An HTTP persistent connection mechanism is used. When Step 602 is executed, if a TCP connection (i.e., second TCP connection) has existed between the PCRF entity and the AF entity, the PCRF entity sends the second HTTP request message to the AF entity by using the existing TCP connection (i.e., second TCP connection). If the TCP connection does not exist between the PCRF entity and the AF entity, the PCRF entity establishes the second TCP connection with the AF entity, and then sends the second HTTP request message. After Step 603 is executed, the second TCP connection is not disconnected.

(2) The HTTP persistent connection mechanism is not used. When Step 602 is executed, the PCRF entity establishes the second TCP connection with the AF, and then sends the second HTTP request message. After Step 603 is executed, the second TCP connection is disconnected.

The PCRF entity may aggregate event information about a plurality of AF sessions in an HTTP request message (e.g., carrying event information and AF session identifier information corresponding to a plurality of AF sessions), and the AF entity may also aggregate answer information about a plurality of reported AF session events in an HTTP answer message.

Figure 7:
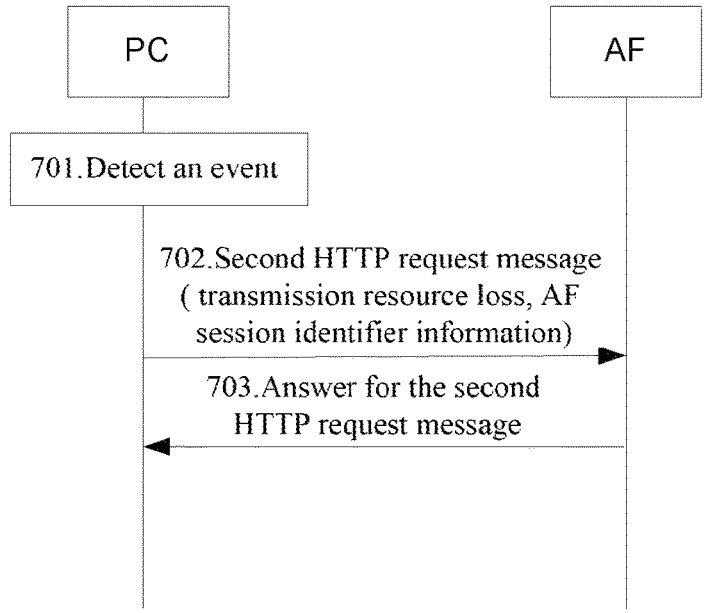
FIG. 7 is a flowchart of IP-CAN session termination according to an embodiment 1 of the present disclosure.

FIG. 7 is a session management flowchart in an IP-CAN session termination process (a PCRF entity notifies an AF entity of IP-CAN session termination, which may be reported as a special traffic plane event), including the following Steps 701 to 703.

In Step 701, A PCRF entity perceives termination of an IP-CAN session.

In Step 702, The PCRF entity notifies an AF entity of a transmission resource loss related to an AF session established in FIG. 3.

In the step, the PCRF entity sends a second HTTP request message to the AF entity, herein the second HTTP request message carrying a session termination requesting indicator and AF session identifier information defined in FIG. 3. A URL for addressing the AF entity in the second HTTP request message is URL1 provided by the AF entity in FIG. 3.

In Step 703, The AF entity determines an application layer session corresponding to the UE according to the AF session identifier information, and learns of a transmission resource loss corresponding to the application layer session, thereby performing related processing. The AF entity returns an answer for the second HTTP request message to the PCRF entity.

In the above-mentioned flow, a TCP connection between the PCRF entity and the AF entity may be processed by using the following two solutions.

(1) An HTTP persistent connection mechanism is used. When Step 702 is executed, if a TCP connection (i.e., second TCP connection) has existed between the PCRF entity and the AF entity, the PCRF entity sends the second HTTP request message to the AF entity by using the existing TCP connection (i.e., second TCP connection). If the TCP connection does not exist between the PCRF entity and the AF entity, the PCRF entity establishes the second TCP connection with the AF entity, and then sends the second HTTP request message. After Step 703 is executed, the second TCP connection is not disconnected.

(2) The HTTP persistent connection mechanism is not used. When Step 702 is executed, the PCRF entity establishes the second TCP connection with the AF entity, and then sends the second HTTP request message. After Step 703 is executed, the second TCP connection is disconnected.

The PCRF may aggregate transmission resource loss event information about a plurality of AF sessions in an HTTP request message (e.g., carrying event information and AF session identifier information corresponding to a plurality of AF sessions), and the AF entity may also aggregate answer information about a plurality of reported AF session events in an HTTP answer message.

Figure 2:
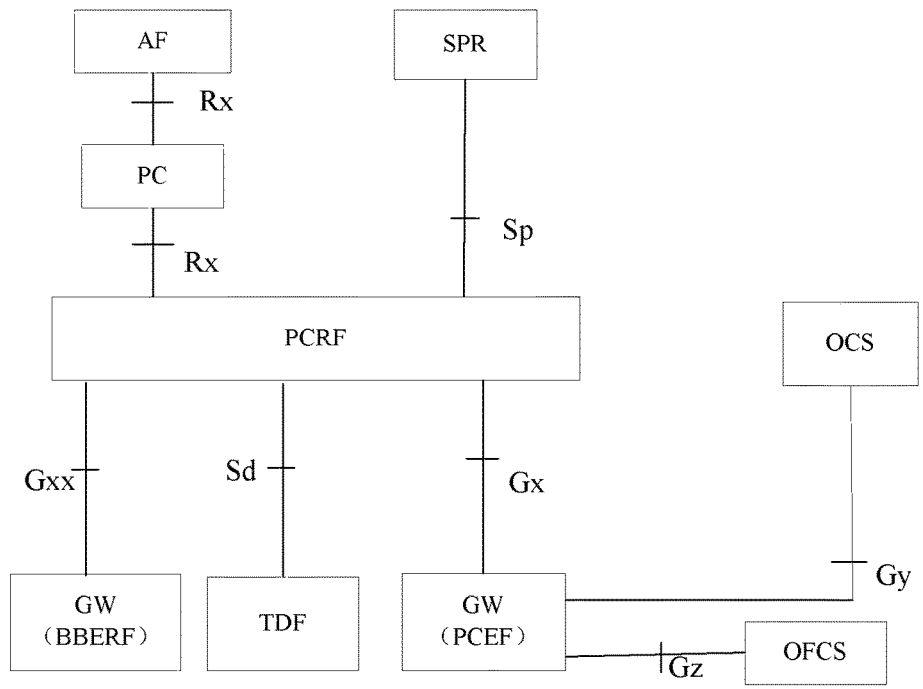
FIG. 2 is a PCC architecture diagram of PC deployment in the conventional art.

A session flow where a PC exists between an AF entity and a PCRF entity is illustrated below by taking a PCC architecture as an example shown in FIG. 2.

Figure 8:
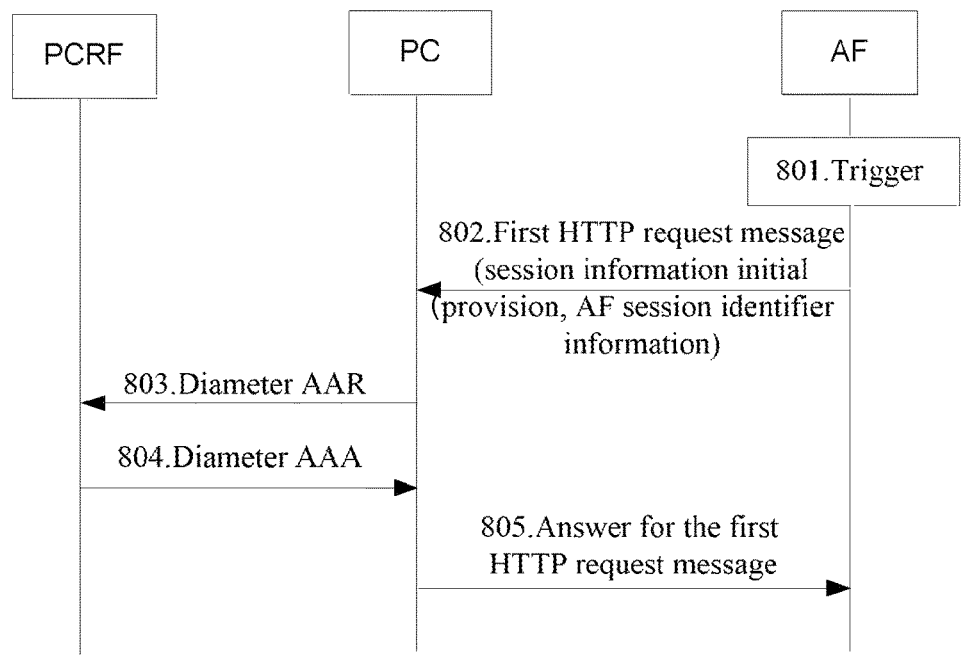
FIG. 8 is a flowchart of AF session establishment according to an embodiment 2 of the present disclosure.

FIG. 8 is a session management flowchart in a session information initial providing process (i.e., AF session establishment process), including the following Steps 801 to 805.

In Step 801, A UE is attached to a network, and initiates an attachment flow, or after the UE initiates an additional PDN connection establishment flow, the UE interacts with an AF to make a media negotiation. The AF entity determines service related information.

In Step 802, The AF entity initiates an AF session establishment flow to a PC to request to establish an AF session, and provides AF session identifier information and service information. The AF session identifier information may be allocated by the AF entity at this time or allocated by the PC in a previous interaction.

In the step, the AF entity sends a first HTTP request message to a PCRF entity, the first HTTP request message carries the AF session identifier information and the service information. The PC saves the AF session identifier information and the service information therein. Besides, the first HTTP message may also carry an explicit AF session establishment indicator. A URL (expressed as URL2) of the AF itself may also be carried in the message. The AF entity may construct a URL of the PC according to an IP address of a UE, a user identifier (if it exists), PDN information and domain identifier information for addressing the PC.

Herein, the AF session identifier information may be a global unique identifier for the AF session for uniquely identifying the AF session, or may be an information combination formed by a service session identifier in combination with other information. In the present embodiment, when the AF session identifier information is a combination of the service session identifier and other information, the AF session identifier information may be expressed by adopting any of the following combinations:

1) a service session identifier and an IP address of a UE; herein, the service session identifier is an identifier capable of uniquely identifying the AF session under the condition of an IP address of the same UE;

2) a service session identifier, an IP address of a UE, and an IP domain identifier; herein, the service session identifier is an identifier capable of uniquely identifying the AF session under the condition of an IP address and IP domain identifier of the same UE;

3) a service session identifier, an IP address of a UE, and a PDN identifier; herein, the service session identifier is an identifier capable of uniquely identifying the AF session under the condition of an IP address and PDN identifier of the same UE; and 4) a service session identifier and a user identifier; herein, the service session identifier is an identifier capable of uniquely identifying the AF session under the condition of an IP address and user identifier of the same UE.

In Step 803, The PC initiates an AF session establishment flow to the PCRF entity to request to establish an AF session, and provides service information.

In the step, the AF entity sends a diameter AAR message to the PCRF entity, the AAR message carries AF session identifier information, a Diameter session identifier and a media information description. Moreover, the PC saves a corresponding relation between the Diameter session identifier and the AF session identifier information in Step 802. The PC may not directly save the AF session identifier information, but rather saves the corresponding relation between the Diameter session identifier and the AF session identifier information in Step 802. (e.g., the PC may deduce the Diameter session identifier according to the AF session identifier information by using a fixed algorithm, thus, when the PC will receive the Diameter session identifier in future, the corresponding AF session identifier information may be deduced according to the algorithm). Besides, the PC further saves a corresponding relation between URL2 and the Diameter session identifier.

In Step 804, The PCRF entity saves the service information, and the PCRF entity returns a Diameter Authentication and Authorization Answer (AAA) message to the PC.

In Step 805, The PC returns an answer for the first HTTP request message to the AF entity.

In the above-mentioned flow, a TCP connection between the AF entity and the PC may be processed by using the following two solutions.

(1) An HTTP persistent connection mechanism is used. When Step 802 is executed, if a TCP connection (i.e., first TCP connection) has existed between the AF entity and the PC, the AF entity sends the first HTTP request message to the PC by using the existing TCP connection. If the TCP connection does not exist, the AF establishes the TCP connection (i.e., first TCP connection) with the PC, and then sends the first HTTP request message. After Step 805 is executed, the first TCP connection is not disconnected.

(2) The HTTP persistent connection mechanism is not used. When Step 802 is executed, the AF entity establishes the first TCP connection with the PC, and then sends the first HTTP request message. After Step 805 is executed, the first TCP connection is disconnected.

In the above-mentioned flow, the AF session identifier information for identifying the AF session is allocated by the AF entity (if AF session identifier information is an independent global unique identifier, the AF session identifier is allocated by the AF, and if AF session identifier information is a combination of a service session identifier and other information, the service session identifier is allocated by the AF). Certainly, related information may also be allocated by the PC. (1) If the AF session identifier information is an independent global unique identifier, the global unique identifier may also be allocated by the PC. That is, in Step 802, the first HTTP request message sent to the PC by the AF entity only carries service information (the service information including a UE IP address, an IP domain identifier (optional), a user identifier (optional), and a PDN identifier (optional)). In Step 803, the PC allocates a global AF session identifier for the AF session according to the service information, and the PC saves a corresponding relation between the Diameter session identifier and an AF session identifier allocated by the PC. In Step 805, the PC returns the AF session identifier in the answer for the first HTTP request message to the AF. (2) If the AF session identifier information is a combination of a service session identifier and other information, the service session identifier may also be allocated by the PC. That is, in Step 802, the first HTTP request message sent to the PCRF entity by the AF entity only carries service information (the service information including a UE IP address, an IP domain identifier (optional), a user identifier (optional), and a PDN identifier (optional)). In Step 803, the PC allocates a service session identifier for the AF session according to the service information, and the PC saves a corresponding relation between the Diameter session identifier and the combination of the service session identifier and other information (i.e., AF session identifier information). In Step 805, the PC returns other information in an information combination of the service session identifier and the AF session identifier (i.e., AF session identifier information) in the answer for the first HTTP request message to the AF entity.

The AF entity may aggregate a plurality of pieces of information for requesting to establish an AF session in an HTTP request message (e.g., carrying service information and AF session identifier information corresponding to a plurality of AF sessions (if the AF session identifier information is allocated by the AF)), and the PC may also aggregate answer information about a plurality of AF sessions requested to be established in an HTTP answer message (e.g., AF session identifier information allocated for each AF session by the PC (if the AF session identifier information is allocated by the PCRF entity)).

Figure 9:
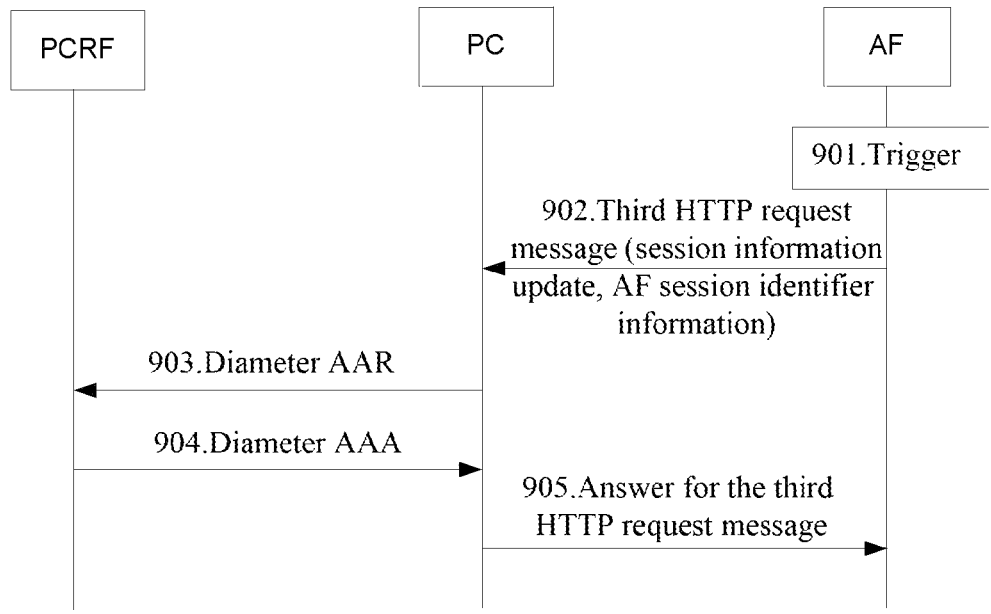
FIG. 9 is a flowchart of AF session modification according to an embodiment 2 of the present disclosure.

FIG. 9 is a session management flowchart in a session information updating process (i.e., AF session modification process), including the following Steps 901 to 905.

In Step 901, A UE interacts with an AF entity to make a media re-negotiation. The AF entity determines service related information.

In Step 902, The AF entity initiates an AF session modification flow to a PC to modify an AF session established in FIG. 8, and provides AF session identifier information and service information.

In the step, the AF entity sends a third HTTP request message to the PC, the third HTTP request message carries AF session identifier information defined in FIG. 8 and media information description. Besides, the third HTTP request message may also carry an explicit AF session modification indicator. The PC determines previously-saved service information according to the AF session identifier information, and performs update.

In Step 903, The PC determines a corresponding Diameter session according to the AF session identifier information. The PC initiates an AF session modification flow to a PCRF, and provides service information.

In the step, the AF sends a diameter AAR message to the PCRF entity, the AAR message carries a corresponding Diameter session entity identifier and a media information description.

In Step 904, The PCRF entity acknowledges the previously-saved service information according to the Diameter session identifier and performs update, and the PCRF entity returns a Diameter AAA message to the PC.

In Step 905, The PC returns an answer for the third HTTP request message to the AF entity.

In the above-mentioned flow, a TCP connection between the AF entity and the PC may be processed by using the following two solutions.

1) An HTTP persistent connection mechanism is used. The AF entity sends the third HTTP request message to the PC by using an existing TCP connection (i.e., first TCP connection).

2) The HTTP persistent connection mechanism is not used. When Step 902 is executed, the AF entity establishes the first TCP connection with the PC, and then sends the third HTTP request message. After Step 905 is executed, the first TCP connection is disconnected.

The AF may aggregate a plurality of pieces of information for requesting to modify an AF session in an HTTP request message (e.g., carrying service information and AF session identifier information corresponding to a plurality of AF sessions), and the PC may also aggregate answer information about a plurality of AF sessions requested to be modified in an HTTP answer message.

Figure 10:
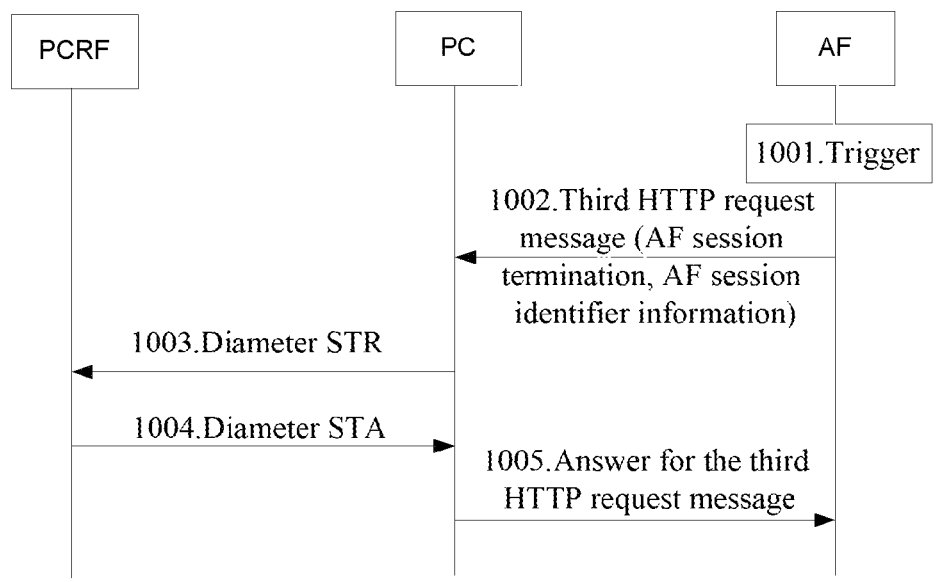
FIG. 10 is a flowchart of AF session termination according to an embodiment 2 of the present disclosure.

FIG. 10 is a session management flowchart in an AF session termination process, including the following Steps 1001 to 1005.

In Step 1001, A UE interacts with an AF entity to terminate a session.

In Step 1002, The AF entity initiates an AF session termination flow to a PC to terminate an AF session established in FIG. 8.

In the step, the AF entity sends a third HTTP request message to the PC, the third HTTP request message carries AF session identifier information defined in FIG. 8 and a session termination indicator.

In Step 1003, The PC determines a corresponding Diameter session according to the AF session identifier information. The PC initiates an AF session termination flow to a PCRF entity.

In the step, the AF entity sends a Diameter STR message to the PCRF, the STR message carries a corresponding Diameter session identifier.

In Step 1004, The PCRF entity determines previously-saved service information according to the Diameter session identifier, and performs deletion. The PCRF entity returns a Diameter STA message to the PC.

In Step 1005, The PC deletes the corresponding service information, and the PC returns an answer for the third HTTP request message to the AF entity.

In the above-mentioned flow, a TCP connection between the AF entity and the PC may be processed by using the following two solutions.

(1) An HTTP persistent connection mechanism is used. The AF entity sends the third HTTP request message to the PC by using an existing TCP connection (i.e., first TCP connection).

(2) The HTTP persistent connection mechanism is not used. When Step 1002 is executed, the AF entity establishes the first TCP connection with the PC, and then sends the third HTTP request message. After Step 1005 is executed, the first TCP connection is disconnected.

The AF may aggregate a plurality of pieces of information for requesting to terminate an AF session in an HTTP request message (e.g., carrying service information and AF session identifier information corresponding to a plurality of AF sessions), and the PC may also aggregate answer information about a plurality of AF sessions requested to be terminated in an HTTP answer message.

Figure 11:
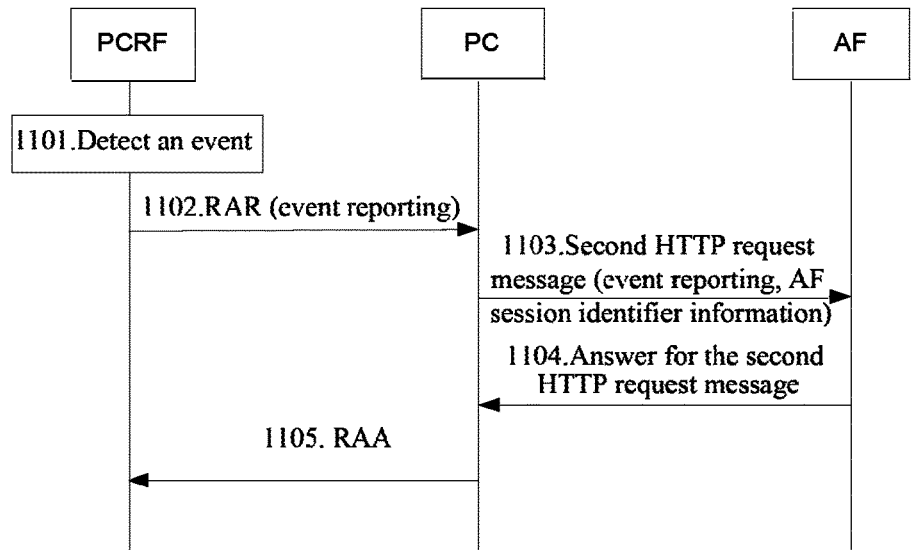
FIG. 11 is a flowchart of event reporting according to an embodiment 2 of the present disclosure.

FIG. 11 is a session management flowchart in a traffic plane event reporting process, including the following Steps 1101 to 1105.

In Step 1101, A PCRF entity perceives a traffic plane event such as change of an IP-CAN type.

In Step 1102, The PCRF entity reports a traffic plane event related to an AF session established in FIG. 8 to a PC.

In the step, the PCRF entity sends a Diameter RAR message to an AF entity, the RAR message carries the traffic plane event and a Diameter session identifier defined in Step 803.

In Step 1103, The PC determines AF session identifier information according to the Diameter session identifier. The PC reports the traffic plane event to the AF.

In the step, the PC sends a second HTTP request message to the AF entity; herein, the message carries the traffic plane event and the corresponding AF session identifier information. A URL for addressing the AF in the second HTTP request message is URL2 provided by the AF in FIG. 8.

In Step 1104, The AF entity determines an application layer session corresponding to the UE according to the AF session identifier information, and learns of a traffic plane event corresponding to the application layer session, thereby performing related processing. The AF returns an answer for the second HTTP request message to the PC.

In Step 1105, The PC returns a Diameter Re-Authentication Answer (RAA) message to the PCRF entity.

In the above-mentioned flow, a TCP connection between the PC and the AF entity may be processed by using the following two solutions.

1) An HTTP persistent connection mechanism is used. When Step 1103 is executed, if a TCP connection (i.e., second TCP connection) has existed between the PC and the AF entity, the PC sends the second HTTP request message to the AF by using the existing TCP connection. If the TCP connection does not exist, the PC establishes the second TCP connection with the AF, and then sends the second HTTP request message. After Step 1104 is executed, the second TCP connection is not disconnected.

2) The HTTP persistent connection mechanism is not used. When Step 1103 is executed, the PC establishes the second TCP connection with the AF entity, and then sends the second HTTP request message. After Step 1104 is executed, the second TCP connection is disconnected.

The PC may aggregate event information about a plurality of AF sessions in an HTTP request message (e.g., carrying event information and AF session identifier information corresponding to a plurality of AF sessions), and the AF may also aggregate answer information about a plurality of reported AF session events in an HTTP answer message.

Figure 12:
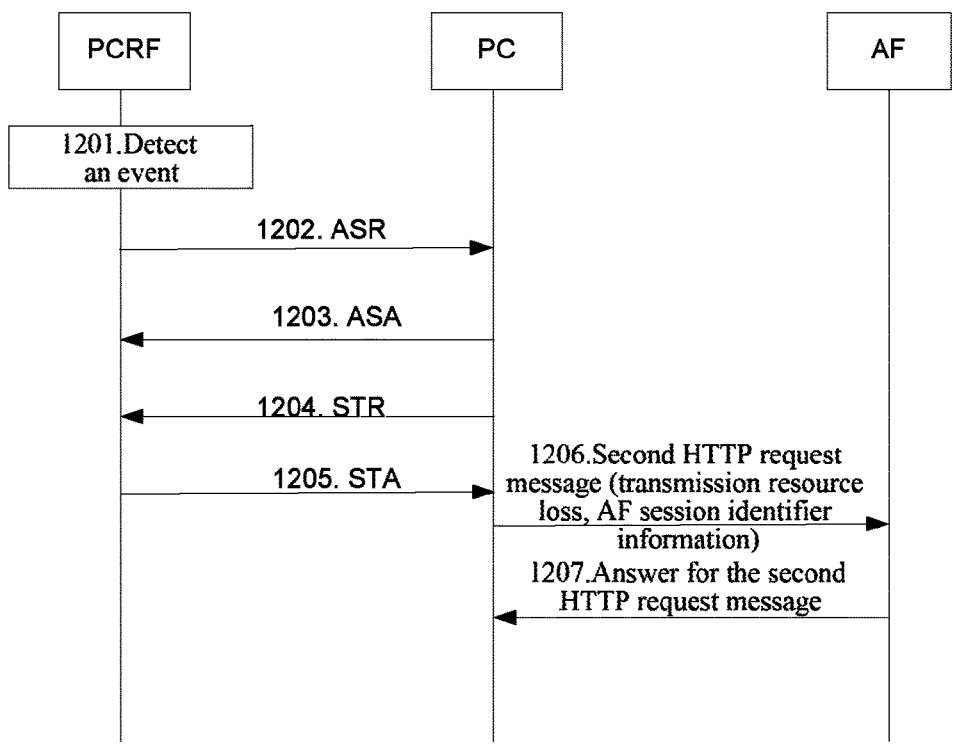
FIG. 12 is a flowchart of IP-CAN session termination according to an embodiment 2 of the present disclosure.

FIG. 12 is a session management flowchart in an IP-CAN session termination process (a PCRF entity notifies an AF entity of IP-CAN session termination, which may be reported as a special traffic plane event), including the following Steps 1201 to 1205.

In Step 1201, A PCRF entity perceives termination of an IP-CAN session.

In Step 1202, The PCRF entity sends a Diameter ASR message to a PC; herein, the message carries a Diameter session identifier.

In Step 1203, The PC returns a Diameter Abort Session Answer (ASA) message to the PCRF entity.

In Step 1204, The PC sends a Diameter STR message to the PCRF entity, the message carries a Diameter session identifier.

In Step 1205, The PCRF entity returns a Diameter STA message to the PC.

In Step 1206, The PC determines corresponding AF session identifier information according to a Diameter session message. The PC notifies an AF entity of a transmission resource loss related to an AF session established in FIG. 8. The step may be triggered by Step 1202 or Step 1205.

In the step, the PC sends a second HTTP request message to the AF entity; herein, the message carries a session termination requesting indicator and the corresponding AF session identifier information. A URL for addressing the AF in the second HTTP message is URL1 provided by the AF in FIG. 8.

In Step 1207, The AF entity determines an application layer session corresponding to the UE according to the AF session identifier information, and learns of a transmission resource loss corresponding to the application layer session, thereby performing related processing. The AF entity returns an answer for the second HTTP request message to the PC.

In the above-mentioned flow, a TCP connection between the PC and the AF entity may be processed by using the following two solutions.

1) An HTTP persistent connection mechanism is used. When Step 1106 is executed, if a TCP connection (i.e., second TCP connection) has existed between the PC and the AF entity, the PC sends the second HTTP request message to the AF entity by using the existing TCP connection. If the TCP connection does not exist, the PC establishes the second TCP connection with the AF entity, and then sends the second HTTP request message. After Step 1107 is executed, the second TCP connection is not disconnected.

2) The HTTP persistent connection mechanism is not used. When Step 1106 is executed, the PC establishes the second TCP connection with the AF entity, and then sends the second HTTP request message. After Step 1107 is executed, the second TCP connection is disconnected.

The PC may aggregate transmission resource loss event information about a plurality of AF sessions in an HTTP request message (e.g., carrying event information and AF session identifier information corresponding to a plurality of AF sessions), and the AF may also aggregate answer information about a plurality of reported AF session events in an HTTP answer message.

Alternatively, in the above-mentioned Step 302 and Step 802, contents in the first HTTP request message sent by the AF entity to the PCRF entity and the PC respectively are described with an XML language as follows (Example 1):

```
<AAR command>
    <Framed-IP-Address Framed-IP-Address="..."></Framed-IP-Address>
    <Framed-IPv6-Prefix Framed-IPv6-Prefix="..."></Framed-IPv6-Prefix>
    <Subscriptions-Id Subscriptions-ID="..."></Subscription-Id>
        <Called-Station-Id Called-Station-ID="..."></Called-Station-Id>
        <Service-Session-Id Service-Session-ID="..."></Service-Session-Id>
        <IP-Domain-Id IP-Domain-ID="..."></IP-Domain-Id>
    <AF-Application-Identifier AF-Application-Identifier="..."></AF-Application-Identifier>
    <Media-Component-Description>
        <Media-Component-Number
Media-Component-Number="..."></Media-Component-Number>
        <Media-Sub-Component>
            <Flow-Number Flow-Number="..."></Flow-Number>
            <Flow-Description Flow-Description="..."></Flow-Description>
            <Flow-Status Flow-Status="..."></Flow-Status>
                <Flow-Usage Flow-Usage="..."></Flow-Usage>
            <Max-Requested-Bandwidth-UL
Max-Requested-Bandwidth-UL="..."></Max-Reqeusted-Bandwidth>
            <Max-Requested-Bandwidth-DL
Max-Requested-Bandwidth-DL="..."></Max-Requested-Bandwidth-DL>
            <AF-Signalling-Protocol
AF-Signalling-Protocol="..."></AF-Signalling-Protocol>
        </Media-Sub-Component>
        <AF-Application-Identifier
AF-Application-Identifier="..."></AF-Application-Identifier>
        <Media-Type Media-Type="..."></Media-Type>
        <Max-Requested-Bandwidth-UL
```

```
Max-Requested-Bandwidth-UL="..."></Max-Reqeusted-Bandwidth-UL>
      <Max-Requested-Bandwidth-DL
Max-Requested-Bandwidth-DL="..."></Max-Requested-Bandwidth-DL>
      <Min-Requested-Bandwidth-UL
Min-Requested-Bandwidth-UL="..."></Min-Reqeusted-Bandwidth-UL>
      <Min-Requested-Bandwidth-DL
Min-Requested-Bandwidth-DL="..."></Min-Requested-Bandwidth-DL>
         <Flow-Status Flow-Status="..."></Flow-Status>
         <Reservation-Priority Reservation-Priority="..."></Reservation-Priority>
         <RS-Bandwidth RS-Bandwidth="..."></RS-Bandwidth>
         <RR-Bandwidth RR-Bandwidth="..."></RR-Bandwidth>
         <Codec-Data Codec-Data="..."></Codec-Data>
   </Media-Component-Description>
   <Service-Info-Status Service-Info-Status="..."></Service-Info-Status>
   <AF-Charging-Identifier AF-Charging-Identifier="..."></AF-Charging-Identifier>
   <SIP-Forking-Indication SIP-Forking-Indication="..."></SIP-Forking-Indication>
   <Specific-Action Specific-Action="..."></Specifici-Action>
</AAR command>
```

In Step 302 and Step 802, the contents in the first HTTP request message sent by the AF entity to the PCRF entity and the PC respectively are described with a JSON language as follows (Example 2):

```
{ "AAR":
  {
    "Framed-IP-Address": "Value1",
    "Framed-IPv6-Prefix": "Value2",
    "Subscription-Id": "Value3",
    "Called-Station-Id": "Value4",
    "Service-Session-Id": "Value5",
    "IP-Domain-Id": "Value6",
    "AF-Application-Identifier": "Value7",
    "Media-Component-Description":
    {
      "Optional": "YES"
       "Media-Component-Number": "Value8",
         "AF-Application-Identifier": "Value9",
            "Media-Type": "Value10",
            "Max-Requested-Bandwidth-UL": "Value11",
            "Max-Requested-Bandwidth-DL": "Value12",
            "Min-Requested-Bandwidth-UL": "Value13",
            "Min-Requested-Bandwidth-DL": "Value14"
         "Flow-Status": "Value15",
         "Reservation-Priority": "Value16",
            "RS-Bandwidth": "Value17",
            "RR-Bandwidth": "Value18",
            "Codec-Data": "Value19",
            "Media-Sub-Component":
         {
            "Flow-Number": "Value20",
            "Flow-Status": "Value21",
            "Flow-Usage": "Value22",
            "Max-Requested-Bandwidth-UL": "Value23",
            "Max-Requested-Bandwidth-DL": "Value24",
            "AF-Signalling-Protocol": "Value25",
            "Flow-Description": "Value26",
         }
      }
      "Service-Info-Status": "Value27"
      "AF-Charging-Identifier": "Value28"
      "SIP-Forking-Indication": "Value29"
      "Specific-Action": "Value30"
    }
  }
}
```

Herein, Framed-IP-Address and Framed-IPv6-Prefix are used for carrying an IPv4 address and IPv6 address of a UE respectively (UE only uses one address access service at one moment, and therefore the two AVPs will not be carried at the same time). Service-Session-Id is used for carrying a service session identifier. IP-Domain-Id is used for carrying an IP domain identifier, and Called-Station-Id is used for carrying a PDN identifier. Subscription-Id is used for carrying a user identifier.

In Step 402 and Step 902, contents in the third HTTP request message sent by the AF entity to the PCRF entity and the PC respectively are described with an XML language as follows, similar to Example 1, and described with a JSON language as follows, similar to Example 2. If Service-Session-Id in Step 302 or Step 802 is a global unique identifier (i.e., AF session identifier), parameters such as Framed-IP-Address, Framed-IPv6-Prefix, Called-Station-Id, Subscription-Id, and IP-Domain-Id are not carried. If Service-Session-Id in Step 302 or Step 802 is not the global unique identifier, parameters identical to those in Step 302 and Step 802 are still carried in order to uniquely identify an AF session.

In Step 502 and Step 1002, contents in the third HTTP request message sent by the AF entity to the PCRF entity and the PC respectively are described with an XML language as follows (Example 3):

```
<STR command>
   <Framed-IP-Address Framed-IP-Address="..."></Framed-IP-Address>
   <Framed-IPv6-Prefix Framed-IPv6-Prefix="..."></Framed-IPv6-Prefix>
   <Subscriptions-Id Subscriptions-ID="..."></Subscription-Id>
      <Called-Station-Id Called-Station-ID="..."></Called-Station-Id>
         <Service-Session-Id Service-Session-ID="..."></Service-Session-Id>
      <IP-Domain-Id IP-Domain-ID="..."></IP-Domain-Id>
      <Termination-Cause Termination-Cause ="..."></Termination-Cause >
</STA command>
```

In Step 502 and Step 1002, the contents in the third HTTP request message sent by the AF entity to the PCRF entity and the PC respectively are described with a JSON language as follows (Example 4):

```
{ "STR":
  {
    "Framed-IP-Address": "Value1",
    "Framed-IPv6-Prefix": "Value2",
    "Subscription-Id": "Value3",
    "Called-Station-Id": "Value4",
    "Service-Session-Id": "Value5",
```

```
    "IP-Domain-Id": "Value6",
    "Termination-Cause": "Value7",
    }
}
```

If Service-Session-Id in Step 302 or Step 802 is a global unique identifier (i.e., AF session identifier), parameters such as Framed-IP-Address, Framed-IPv6-Prefix, Called-Station-Id, Subscription-Id, and IP-Domain-Id are not carried. If Service-Session-Id in Step 302 or Step 802 is not the global unique identifier, parameters identical to those in Step 302 and Step 802 are still carried in order to uniquely identify an AF session.

In Step 602 and Step 1103, contents in the second HTTP request messages sent to the AF entity by the PCRF entity and sent to the AF entity by the PC are described with an XML, language as follows (Example 5):

```
</RAR command>
    <Framed-IP-Address Framed-IP-Address="..."></Framed-IP-Address>
    <Framed-IPv6-Prefix Framed-IPv6-Prefix="..."></Framed-IPv6-
    Prefix>
    <Subscriptions-Id Subscriptions-ID="..."></Subscription-Id>
        <Called-Station-Id Called-Station-ID="..."></Called-Station-Id>
        <Service-Session-Id Service-Session-ID="..."></Service-Session-Id>
        <IP-Domain-Id IP-Domain-ID="..."></IP-Domain-Id>
        <Specific-Action Specific-Action="..."></Specific-Action>
        <Abort-Cause Abort-Cause="..."></Abort-Cause>
        <Access-Network-Charging-Identifier   Access-Network-
Charging-Identifier ="..."></ Access-Network-Charging-Identifier >
        <Access-Network-Charging-Address   Access-Network-
Charging-Address ="..."></ Access-Network-Charging-Address>
        <Flows >
            <Media-Component-Number
Media-Component-Number="..."></Media-Component-Number>
                <Flow-Number Flow-Number="..."></Flow-Number>
                <Final-Unit-Action Final-Unit-Action="..."></Final-Unit-
                Action>
            </Flows>
        <IP-CAN-Type IP-CAN-Type="..."></IP-CAN-Type>
        <RAT-Type RAT-Type>="..."></RAT-Type>
</RAR command>
```

In Step 602 and Step 1103, the contents in the second HTTP request messages sent to the AF entity by the PCRF entity and sent to the AF entity by the PC are described with a JSON language as follows (Example 6):

```
{ "RAR":
    {
        "Framed-IP-Address": "Value1",
        "Framed-IPv6-Prefix": "Value2",
        "Subscription-Id": "Value3",
        "Called-Station-Id": "Value4",
        "Service-Session-Id": "Value5",
        "IP-Domain-Id": "Value6",
        " Specific-Action": "Value7",
        " Abort-Cause": "Value8",
        " Access-Network-Charging-Identifier ": "Value9",
        " Access-Network-Charging-Address": "Value10",
        "Flows":
        {
            " Media-Component-Number ": "Value11",
            " Flow-Number ": "Value12",
            " Final-Unit-Action": "Value13",
        }
        " IP-CAN-Type": "Value14",
        " RAT-Type ": "Value15",
    }
}
```

If Service-Session-Id in Step 302 or Step 802 is a global unique identifier (i.e., AF session identifier), parameters such as Framed-IP-Address, Framed-IPv6-Prefix, Called-Station-Id, Subscription-Id, and IP-Domain-Id are not carried. If Service-Session-Id in Step 302 or Step 802 is not the global unique identifier, parameters identical to those in Step 302 and Step 802 are still carried in order to uniquely identify an AF session.

In Step 702 and Step 1103, contents in the second HTTP request messages sent to the AF entity by the PCRF entity and sent to the AF entity by the PC are described with an XML, language as follows (Example 7):

```
<STR command>
    <Framed-IP-AddressFramed-IP-Address="..."></Framed-IP-Address>
    <Framed-IPv6-Prefix Framed-IPv6-Prefix="..."></Framed-IPv6-Prefix>
    <Subscriptions-Id Subscriptions-ID="..."></Subscription-Id>
    <Called-Station-Id Called-Station-ID="..."></Called-Station-Id>
    <Service-Session-Id Service-Session-ID="..."></Service-Session-Id>
    <IP-Domain-Id IP-Domain-ID="..."></IP-Domain-Id>
    <Abort-Cause Abort-Cause="..."></Abort-Cause>
<STR command>
```

In Step 702 and Step 1103, the contents in the second HTTP request messages sent to the AF entity by the PCRF entity and sent to the AF entity by the PC are described with a JSON language as follows (Example 8):

```
{ "RAR":
    {
        "Framed-IP-Address": "Value1",
        "Framed-IPv6-Prefix": "Value2",
        "Subscription-Id": "Value3",
        "Called-Station-Id": "Value4",
        "Service-Session-Id": "Value5",
        "IP-Domain-Id": "Value6",
        "Abort-Cause": "Value7",
    }
}
```

If Service-Session-Id in Step 302 or Step 802 is a global unique identifier (i.e., AF session identifier), parameters such as Framed-IP-Address, Framed-IPv6-Prefix, Called-Station-Id, Subscription-Id, and IP-Domain-Id are not carried. If Service-Session-Id in Step 302 or Step 802 is not the global unique identifier, parameters identical to those in Step 302 and Step 802 are still carried in order to uniquely identify an AF session.

Embodiment 2

The present embodiment provides an AF entity, which supports an HTTP client and an HTTP server at the same time and may implement various functions of an AF in the above-mentioned embodiment 1. The AF entity at least includes the following units:

a first unit, arranged to: send, when the AF entity establishes an AF session with a policy server, a first HTTP request message to the policy server and receive an answer for the first HTTP request message returned by the policy server, herein, the first unit is arranged to: carry AF session identifier information in the first HTTP request message, or acquire the AF session identifier information from the answer for the first HTTP request message returned by the policy server; and a second unit, arranged to: receive a second HTTP request message sent by the policy server and carrying the AF session identifier information, when the policy server notifies the AF entity of a traffic plane event of the AF session, and return an answer for the second HTTP request message to the policy server.

On the basis of the above-mentioned architecture, the AF entity further includes: a third unit, arranged to: send, when the AF and the policy server modify or terminate the AF session, a third HTTP request message carrying the AF session identifier information to the policy server, and receive an answer for the third HTTP request message returned by the policy server.

It should be noted that a TCP connection between the AF entity and the policy server in the present embodiment may be processed with or without an HTTP persistent connection mechanism. For example, when a TCP connection (i.e., first TCP connection) has existed between the present AF entity and the policy server, the first unit sends the first HTTP request message by using the first TCP connection; and when the TCP connection is not established between the present AF and the policy server, the first unit establishes the first TCP connection with the policy server, and then sends the first HTTP request message. Likewise, when the TCP connection (i.e., first TCP connection) has existed between the present AF entity and the policy server, the third unit sends the third HTTP request message by using the first TCP connection; and when the TCP connection is not established between the present AF and the policy server, the third unit establishes the first TCP connection with the policy server, and then sends the third HTTP request message.

The first unit is arranged to: retain or disconnect, after receiving the answer for the first HTTP request message sent by the policy server, the first TCP connection between the present AF and the policy server. Likewise, the third unit may retain or disconnect the first TCP connection between the present AF and the policy server after receiving the answer for the third HTTP request message sent by the policy server.

It also should be noted that the second unit is arranged to: receive the second HTTP request message, sent by the policy server, by using a second TCP connection between the policy server and the present AF entity. Accordingly, the second unit returns the answer for the second HTTP request message to the policy server by using the second TCP connection.

Under a specific application scenario, a session management process between the above-mentioned AF entity and the policy server may refer to corresponding contents in the above-mentioned embodiment 1, which will not be elaborated herein.

Embodiment 3

The present embodiment provides a policy server, which supports an HTTP client and an HTTP server at the same time and may implement various functions of a policy server in the above-mentioned embodiment 1. The policy server at least includes a first unit and a second unit.

The first unit is arranged to: receive a first HTTP request message sent by an AF entity and carrying AF session identifier information, and return an answer for the first HTTP request message to the AF entity; or, receive a first HTTP request message sent by an AF entity, allocate AF session identifier information for an AF session, and return an answer for the first HTTP request message carrying the AF session identifier information to the AF entity.

Alternatively, the above-mentioned first unit is arranged to: receive the first HTTP request message by using a first TCP connection between the AF entity and the present policy server, and accordingly, return the answer for the first HTTP request message to the AF entity by using the first TCP connection.

The second unit is arranged to: send, when notifying the AF entity of a traffic plane event of the AF session, a second HTTP request message carrying the AF session identifier information to the AF entity, and receive an answer for the second HTTP request message returned by the AF entity.

Alternatively, when a second TCP connection has existed between the present policy server and the AF entity, the second unit sends the second HTTP request message to the AF by using the second TCP connection; and when the second TCP connection is not established between the present policy server and the AF, the second unit establishes the second TCP connection with the AF first, and then sends the second HTTP request message.

It also should be noted that after receiving the answer for the second HTTP request message sent by the AF entity, the above-mentioned second unit may retain or disconnect the second TCP connection between the present policy server and the AF entity.

In practical application, the above-mentioned policy server may be a PCRF entity or a PC. a session management process between the PCRF entity or PC and the AF entity may refer to corresponding contents in the above-mentioned embodiment 1, which will not be elaborated herein.

Embodiment 4

The present embodiment provides a PC, which may serve as a policy server in the above-mentioned embodiment 1 for processing session management. The PC at least includes the following units:

a first unit, arranged to: receive a first HTTP request message sent by an AF entity and carrying AF session identifier information in an AF session establishment process, send a Diameter AAR message carrying a Diameter session identifier to a PCRF entity, request to establish a diameter session, and keep a corresponding relation between the AF session identifier information and the Diameter session identifier; or, receive a first HTTP request message sent by an AF entity in an AF session establishment process, allocate AF session identifier information for an AF session, send a Diameter AAR message carrying a Diameter session identifier to a PCRF entity, request to establish a diameter session, and keep a corresponding relation between the AF session identifier information and the Diameter session identifier;

a second unit, arranged to: receive a third HTTP request message sent by the AF entity and carrying the AF session identifier information in an AF session modification or termination process, and send a Diameter AAR message or Diameter STR message carrying the above-mentioned Diameter session identifier to the PCRF entity; and a third unit, arranged to: receive a Diameter RAR, ASR or STA message sent by the PCRF entity and carrying the above-mentioned Diameter session identifier in a traffic plane event reporting process, and send the second HTTP request message carrying the above-mentioned AF session identifier information to the AF.

The embodiments of the present disclosure also provide a computer program, including program instructions. When the program instructions are executed by an AF entity, the AF entity is enabled to execute the above-mentioned method.

The embodiments of the present disclosure also provide a computer program, including program instructions. When the program instructions are executed by a policy server, the policy server is enabled to execute the above-mentioned method.

The embodiments of the present disclosure also provide a carrier carrying any one of the above-mentioned computer programs.

In conclusion, the above-mentioned embodiments solve the problem that an AF entity and a PCRF entity or PC can perform two-way information transmission in real time based on an HTTP.

Those of ordinary skill in the art may understand that all or some of the steps in the above-mentioned method may be implemented by instructing related hardware via a program. The program may be stored in a computer-readable storage medium such as a read-only memory, a magnetic disk or an optical disk. Alternatively, all or some of the steps in the above-mentioned embodiments may also be implemented by using one or more integrated circuits. Accordingly, each module/unit in the above-mentioned embodiments may be implemented in a form of hardware, or may be implemented in a form of a software function module. The present application is not limited to combination of hardware and software in any specific form.

The above is only alternative embodiments of the present disclosure, and not intended to limit the scope of protection of the present disclosure. Any modifications, equivalent replacements, improvements and the like made within the spirit and principle of the present disclosure should fall within the scope of protection of the present disclosure.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

INDUSTRIAL APPLICABILITY

The embodiments of the present disclosure solve the problem that an AF entity and a PCRF entity or PC can perform two-way information transmission in real time based on an HTTP.

I claim:

1. A session management method, comprising:
sending, by an application function AF entity, a first Hypertext Transfer Protocol HTTP request message to a policy server when the AF entity establishes an AF session with the policy server,
wherein the AF entity sends AF session identifier information to the policy server via the first HTTP request message; or, the AF entity acquires AF session identifier information allocated for the AF session by the policy server from an answer for the first HTTP request message returned by the policy server;
receiving, by the AF entity, a second HTTP request message sent to the AF entity when the policy server notifies the AF entity of a traffic plane event of the AF session, wherein the second HTTP request message includes the AF session identifier information; and
returning, by the AF entity, an answer for the second HTTP request message to the policy server; the method further comprising:
when the AF entity modifies or terminates the AF session, sending, by the AF entity, a third HTTP request mes-sage to the policy server, wherein the third HTTP request message includes the AF session identifier information; and
receiving, by the AF entity, an answer for the third HTTP request message returned by the policy server; wherein sending, by the AF entity, the first HTTP request message or the third HTTP request message to the policy server comprises:
when a first Transmission Control Protocol TCP connection has existed between the AF entity and the policy server, sending, by the AF entity, the first HTTP request message or the third HTTP request message to the policy server by using the first TCP connection; and
when the first TCP connection is not established between the AF entity and the policy server, establishing, by the AF, the first TCP connection with the policy server first, and then sending the first HTTP request message or the third HTTP request message.

2. The method according to claim 1, wherein
the policy server is a Policy and Charging Rules Function PCRF entity or a Protocol Converter PC.

3. The method according to claim 1, wherein the AF session identifier information is a global unique identifier.

4. The method according to claim 1, wherein the AF entity supports an HTTP client and an HTTP server simultaneously, and the policy server supports an HTTP client and an HTTP server simultaneously.

5. A session management method, comprising:
receiving, by a policy server, a first Hypertext Transfer Protocol HTTP request message sent by an Application Function AF entity and including AF session identifier information, and returning an answer for the first HTTP request message to the AF entity; or, receiving a first HTTP request message sent by an AF entity, allocating AF session identifier information for an AF session, and returning an answer for the first HTTP request message including the AF session identifier information to the AF entity; and
when notifying the AF entity of a traffic plane event of the AF session, sending a second HTTP request message to the AF entity, wherein the second HTTP request message includes the AF session identifier information; and
receiving an answer for the second HTTP request message returned by the AF entity; wherein
the policy server is a Policy and Charging Rules Function PCRF entity or a Protocol Converter PC; wherein the policy server is a PC, and after the policy server receives the first HTTP request message, the method further comprises: sending, by the PC, a diameter Authentication and Authorization Request AAR message to a PCRF entity, requesting to establish a diameter session, wherein the AAR message includes a diameter session identifier; and keeping, by the PC, a mapping between the AF session identifier information and the diameter session identifier,
and,
the method further comprises: receiving, by the policy server, a third HTTP request message sent by the AF entity to the PC and including the AF session identifier information; and sending, by the PC, a diameter AAR message or a diameter Session Termination Request STR message to the PCRF entity, wherein the AAR or STR message includes the diameter session identifier.

6. The method according to claim 5, wherein sending, by the policy server, the second HTTP request message to the AF entity comprises:
when a second Transmission Control Protocol TCP connection has existed between the policy server and the AF entity, sending, by the policy server, the second HTTP request message to the AF entity by using the second TCP connection; and when the second TCP connection is not established between the policy server and the AF entity, establishing, by the policy server, the second TCP connection with the AF entity first, and then sending the second HTTP request message.

7. The method according to claim 5, wherein when the policy server is a PC, sending, by the policy server, the second HTTP request message to the AF entity comprises:

when the PCRF entity sends a diameter Re-Authentication Request RAR including the diameter session identifier, and an Abort Session Request ASR or Session Termination Answer STA message to the PC, sending, by the PC, the second HTTP request message including the AF session identifier information to the AF entity.

8. An Application Function AF entity, comprising:

a first unit, arranged to: send a first Hypertext Transfer Protocol HTTP request message to a policy server and receive an answer for the first HTTP request message returned by the policy server when the AF entity establishes an AF session with the policy server, wherein the first unit is arranged to: include AF session identifier information in the first HTTP request message, or acquire the AF session identifier information from the answer for the first HTTP request message returned by the policy server; and a second unit, arranged to: receive a second HTTP request message sent by the policy server and including the AF session identifier information when the policy server notifies the AF entity of a traffic plane event of the AF session, and return an answer for the second HTTP request message to the policy server; the AF entity further comprising:

a third unit, arranged to: send, when the AF entity modifies or terminates the AF session, a third HTTP request message to the policy server, wherein the third HTTP request message includes the AF session identifier information, and receive an answer for the third HTTP request message returned by the policy server.

9. The AF entity according to claim 8, wherein the first unit is arranged to: send, when a first Transmission Control Protocol TCP connection has existed between the AF entity and the policy server, the first HTTP request message to the policy server by using the first TCP connection; establish, when the first TCP connection is not established between the present AF and the policy server, the first TCP connection with the policy server first, and then send the first HTTP request message; and the third unit is arranged to: send, when the first TCP connection has existed between the AF entity and the policy server, the third HTTP request message to the policy server by using the first TCP connection; establish, when the first TCP connection is not established between the present AF and the policy server, the first TCP connection with the policy server first, and then send the third HTTP request message.

10. The AF entity according to claim 8, wherein the second unit is arranged to: receive the second HTTP request message by using a second TCP connection between the policy server and the AF entity, and return the answer for the second HTTP request message to the policy server by using the second TCP connection.

11. A policy server, comprising:

a first unit, arranged to: receive a first Hypertext Transfer Protocol HTTP request message sent by an Application Function AF entity and including AF session identifier information, and return an answer for the first HTTP request message to the AF entity; or, receive a first HTTP request message sent by an AF entity, allocate AF session identifier information for an AF session, and return an answer for the first HTTP request message including the AF session identifier information to the AF entity; and a second unit, arranged to: send, when notifying the AF entity of a traffic plane event of the AF session, a second HTTP request message to the AF entity, wherein the second HTTP request message includes the AF session identifier information; and receive an answer for the second HTTP request message returned by the AF entity; wherein the second unit is arranged to: send, when a second TCP connection has existed between the present policy server and the AF, the second HTTP request message to the AF by using the second TCP connection; and establish, when the second TCP connection is not established between the policy server and the AF, the second TCP connection with the AF first, and then send the second HTTP request message.

12. The policy server according to claim 11, wherein the first unit is arranged to: receive the first HTTP request message by using a first Transmission Control Protocol TCP connection between the AF entity and the present policy server, and return the answer for the first HTTP request message to the AF entity by using the first TCP connection.

13. The policy server according to claim 11, wherein the policy server is a Policy and Charging Rules Function PCRF entity or a Protocol Converter PC.

14. Protocol Converter PC, comprising:

a first unit, arranged to: receive a first Hypertext Transfer Protocol HTTP request message sent by an Application Function AF entity and including AF session identifier information in an AF session establishment process, send a diameter Authentication and Authorization Request AAR message to a Policy and Charging Rules Function PCRF entity, request to establish a diameter session, wherein the AAR message includes a diameter session identifier, and keep a mapping between the AF session identifier information and the diameter session identifier; or, receive a first HTTP request message sent by an AF entity, allocate AF session identifier information for the AF session, send a diameter AAR message to a PCRF entity, request to establish a diameter session, wherein the AAR message includes a diameter session identifier, and keep a mapping between the AF session identifier information and the diameter session identifier;

a second unit, arranged to: receive a third HTTP request message sent by the AF entity and including the AF session identifier information in an AF session modification or termination process, and send a diameter AAR message or a diameter Session Termination Request STR message to the PCRF entity; and a third unit, arranged to: receive a diameter Re-Authentication Request RAR sent by the PCRF entity and including the diameter session identifier, and an Abort Session Request ASR or Session Termination Answer STA message in a traffic plane event reporting process, and send the second HTTP request message including the AF session identifier information to the AF.

* * * * *